US012587416B2

(12) United States Patent
Srirama reddy Manjuladevi et al.

(10) Patent No.: US 12,587,416 B2
(45) Date of Patent: Mar. 24, 2026

(54) SYSTEM AND METHOD FOR ANGLE OF ARRIVAL (AoA) ESTIMATION

(71) Applicant: NXP B.V., Eindhoven (NL)

(72) Inventors: Shreyas Srirama reddy Manjuladevi, Irvine, CA (US); Radha Srinivasan, Irvine, CA (US); Tushar Nagrare, Irvine, CA (US)

(73) Assignee: NXP B.V., Eindhoven (NL)

( * ) Notice: Subject to any disclaimer, the term of this patent is extended or adjusted under 35 U.S.C. 154(b) by 397 days.

(21) Appl. No.: 18/208,080

(22) Filed: Jun. 9, 2023

(65) Prior Publication Data

US 2024/0414026 A1     Dec. 12, 2024

(51) Int. Cl.
H04L 25/02     (2006.01)
H04B 1/7163     (2011.01)

(52) U.S. Cl.
CPC ....... H04L 25/0212 (2013.01); H04B 1/7163 (2013.01)

(58) Field of Classification Search
CPC ......................... H04L 25/0212; H04B 1/7163
See application file for complete search history.

(56) References Cited

U.S. PATENT DOCUMENTS

2022/0196782 A1     6/2022     Dawar et al.
2023/0164001 A1*    5/2023     Hong .................. H04L 25/0212
                                                          375/260

FOREIGN PATENT DOCUMENTS

CA          2307532 A1     11/2000

OTHER PUBLICATIONS

Zhonghai Wang et al: "A New Multi-Antenna Based LOS-NLOS Separation Technique", Digital Signal Processing Workshop and 5th Ieee Signal Processing Education Workshop, 2009. DSP/SPE 2009. IEEE 13th, IEEE, Piscataway, NJ, USA, Jan. 4, 2009, pp. 331-336.

* cited by examiner

*Primary Examiner* — Elton Williams

(57)     ABSTRACT

Embodiments of wireless communications systems, ultra-wide band (UWB) systems, and methods for wireless communications are described. In an embodiment, a wireless communications system includes a processor configured to obtain an angle of arrival (AoA) estimate from wireless signals; perform a Channel Impulse Response (CIR) analysis, and determine a confidence level for the AoA estimate based on the CIR analysis.

19 Claims, 12 Drawing Sheets

FoM ALGORITHM

400

402

CIR ANALYSIS:
A) MULTIPATH COMPONENT INFORMATION
B) PDoA VARIANCE INFORMATION

404

INFORMATION FOR AoA ALGORITHM:
A) CALIBRATION PDoA CURVES FOR THE ANTENNA PAIR
B) AoA ESTIMATE

406

COMBINATION STAGE

408

FINAL CONFIDENCE LEVEL

OBTAIN AN ANGLE OF ARRIVAL (AoA) ESTIMATE FROM WIRELESS SIGNALS 1102

PERFORM A CHANNEL IMPULSE RESPONSE (CIR) ANALYSIS 1104

DETERMINE A CONFIDENCE LEVEL FOR THE AoA ESTIMATE BASED ON THE CIR ANALYSIS 1106

1

SYSTEM AND METHOD FOR ANGLE OF ARRIVAL (AoA) ESTIMATION

BACKGROUND

Angle and range information can be obtained using wireless communications technology, which has given rise to various applications that require angle (e.g., angle of arrival (AoA)) and range information. However, when a communications system operates in a Non Line of sight (NLoS) scenario or other multipath environment, the channel between devices and the phase of signals may experience drastic changes and thus can result in less precise AoA estimates. Therefore, there is a need for a wireless communications technology that can distinguish between AoA estimates, e.g., distinguish good from bad AoA estimates and/or distinguish precise from imprecise AoA estimates.

SUMMARY

Embodiments of wireless communications systems, ultra-wide band (UWB) systems, and methods for wireless communications are described. In an embodiment, a wireless communications system includes a processor configured to obtain an angle of arrival (AoA) estimate from wireless signals; perform a Channel Impulse Response (CIR) analysis, and determine a confidence level for the AoA estimate based on the CIR analysis.

In an embodiment, the processor is further configured to perform the CIR analysis to obtain multipath component information and phase difference of Arrival (PDoA) variance information.

In an embodiment, the multipath component information includes confidence information of a rising edge and confidence information of a main lobe width of complex CIR samples.

In an embodiment, the multipath component information further includes confidence information of a first valid index difference of the complex CIR samples.

In an embodiment, the multipath component information further includes confidence information of a first path index difference of the complex CIR samples.

In an embodiment, the multipath component information includes a combination of a confidence level of a rising edge and a confidence level of a main lobe width of complex CIR samples, a confidence level of a first valid index difference of the complex CIR samples, and a confidence level of a first path index difference of the complex CIR samples.

In an embodiment, the PDoA variance information includes a signal-to-noise (SNR) ratio variance at a PDoA index on complex CIR samples and PDoA drift information.

In an embodiment, the processor is further configured to analyze complex CIR samples to obtain confidence information of a rising edge and confidence information of a main lobe width of the complex CIR samples.

In an embodiment, the processor is further configured to obtain a PDoA slope value and PDoA ambiguous region information and to determine the confidence level for the AoA estimate based on the PDoA slope value and the PDoA ambiguous region information.

In an embodiment, the wireless signals include UWB signals.

In an embodiment, the wireless communications system further includes a multi-antenna UWB receiver configured to receive the UWB signals.

In an embodiment, a UWB system includes a multi-antenna UWB receiver arrangement configured to receive UWB signals and a processor operably connected to the multi-antenna UWB receiver arrangement and configured to obtain an angle of arrival (AoA) estimate from the UWB signals, perform a Channel Impulse Response (CIR) analysis by analyzing complex CIR samples of receivers of the multi-antenna UWB receiver arrangement and determine a confidence level for the AoA estimate based on the CIR analysis, and a storage unit configured to store the AoA estimate and the confidence level for the AoA estimate.

In an embodiment, the processor is further configured to perform the CIR analysis to obtain multipath component information and PDoA variance information.

In an embodiment, the multipath component information includes confidence information of a rising edge and confidence information of a main lobe width of the complex CIR samples of the multi-antenna UWB receiver arrangement.

In an embodiment, the multipath component information further includes confidence information of a first valid index difference of the complex CIR samples of the multi-antenna UWB receiver arrangement.

In an embodiment, the multipath component information further includes confidence information of a first path index difference of the complex CIR samples of the multi-antenna UWB receiver arrangement.

In an embodiment, the PDoA variance information includes a SNR ratio variance at a PDoA index on the complex CIR samples of the multi-antenna UWB receiver arrangement and PDoA drift information.

In an embodiment, the processor is further configured to obtain a PDoA slope value and PDoA ambiguous region information and to determine the confidence level for the AoA estimate based on the CIR analysis, the PDoA slope value, and the PDoA ambiguous region information.

In an embodiment, a method for wireless communications involves obtaining an AoA estimate from wireless signals, performing a CIR analysis, and determining a confidence level for the AoA estimate based on the CIR analysis.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Ultra-wide band (UWB) refers to a wireless communication technology in which wireless signals are transmitted over a wide spectrum of frequency bands. In some instances, UWB systems operate in the frequency range of 3 kHz to 300 GHz.

Figure 1:
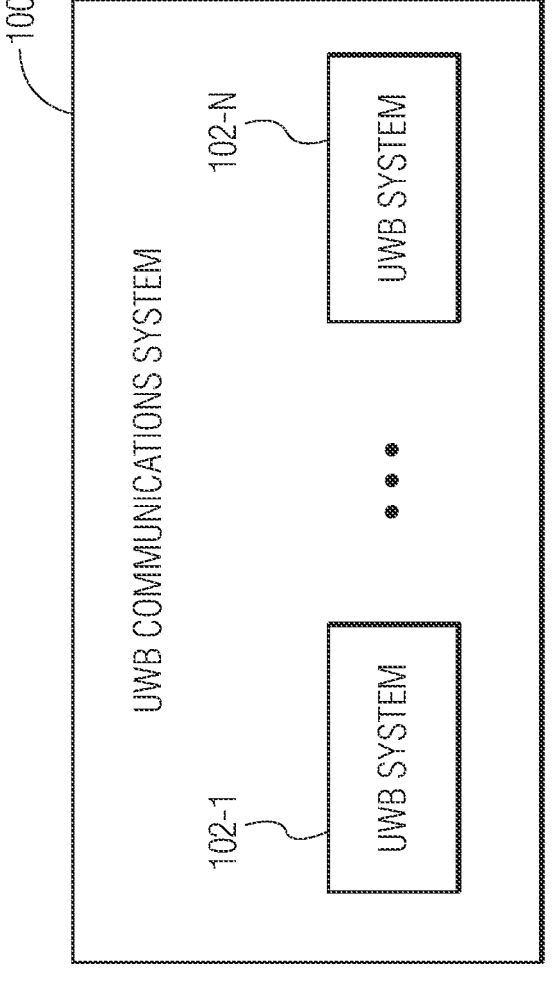
FIG. 1 depicts an embodiment of a UWB communications system in accordance with an embodiment of the invention.

FIG. 1 depicts an embodiment of a UWB communications system 100 in accordance with an embodiment of the invention. In the embodiment depicted in FIG. 1, the UWB communications system 100 includes multiple UWB systems 102-1, . . . , 102-N, where N is a positive integer that is greater than one. The UWB systems 102-1, . . . , 102-N communicate with each other via UWB signals. The UWB systems may have a wide range of mobility and portability. In an embodiment, at least one of the UWB systems is a handheld mobile device such as a cellular phone, a Smartphone, a Personal Digital Assistant (PDA), an Enterprise digital assistant (EDA), a handheld gaming device, or a wearable device. In another embodiment, at least one of the UWB systems is a portable computing device such as a laptop computer, a netbook computer, or a tablet computer. The UWB communications system 100 depicted in FIG. 1 can be used in various applications, for example, in communications and indoor localization applications (e.g., within parking structures, shopping malls, airports, train stations, and hospitals). For example, highly precise angle and range information of a device can be achieved with large bandwidths that UWB technology offers, which has given rise to various applications that require angle (e.g., AoA) and range information in device-to-device communications, smart homes, smart retails and smart enterprises, etc. As new applications emerge, the need to have precise angle and range information becomes important.

Figure 2A:
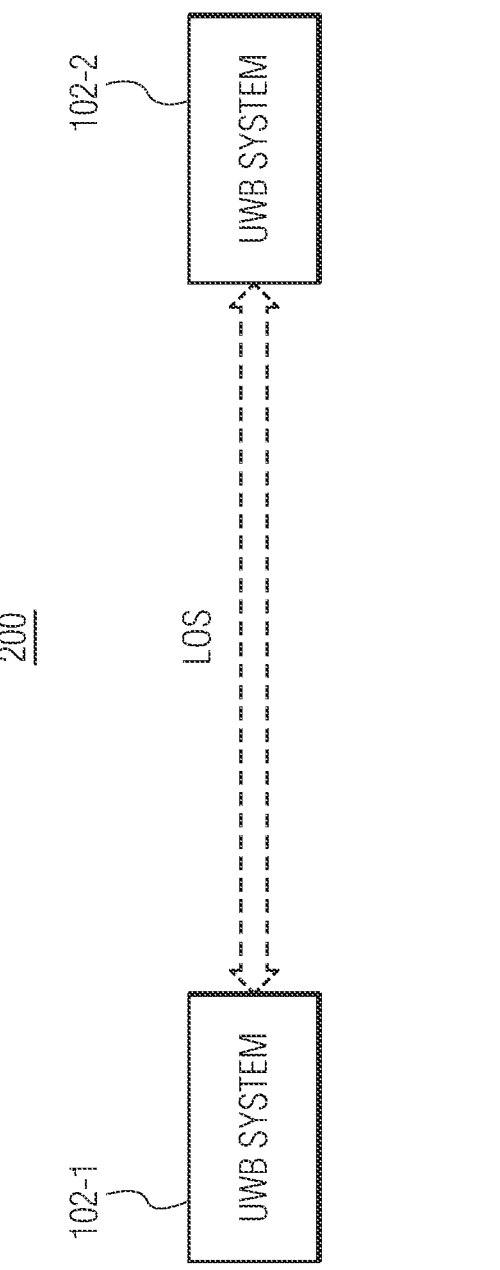
FIG. 2A depicts a Line of sight (LoS) communications scenario of the UWB communications system depicted in FIG. 1.

FIG. 2A depicts a Line of sight (LoS) communications scenario 200 of the UWB communications system 100 depicted in FIG. 1. In the LoS communications scenario 200 depicted in FIG. 2A, the UWB system 102-1 communicates with the UWB system 102-2 in LoS.

Figure 2B:
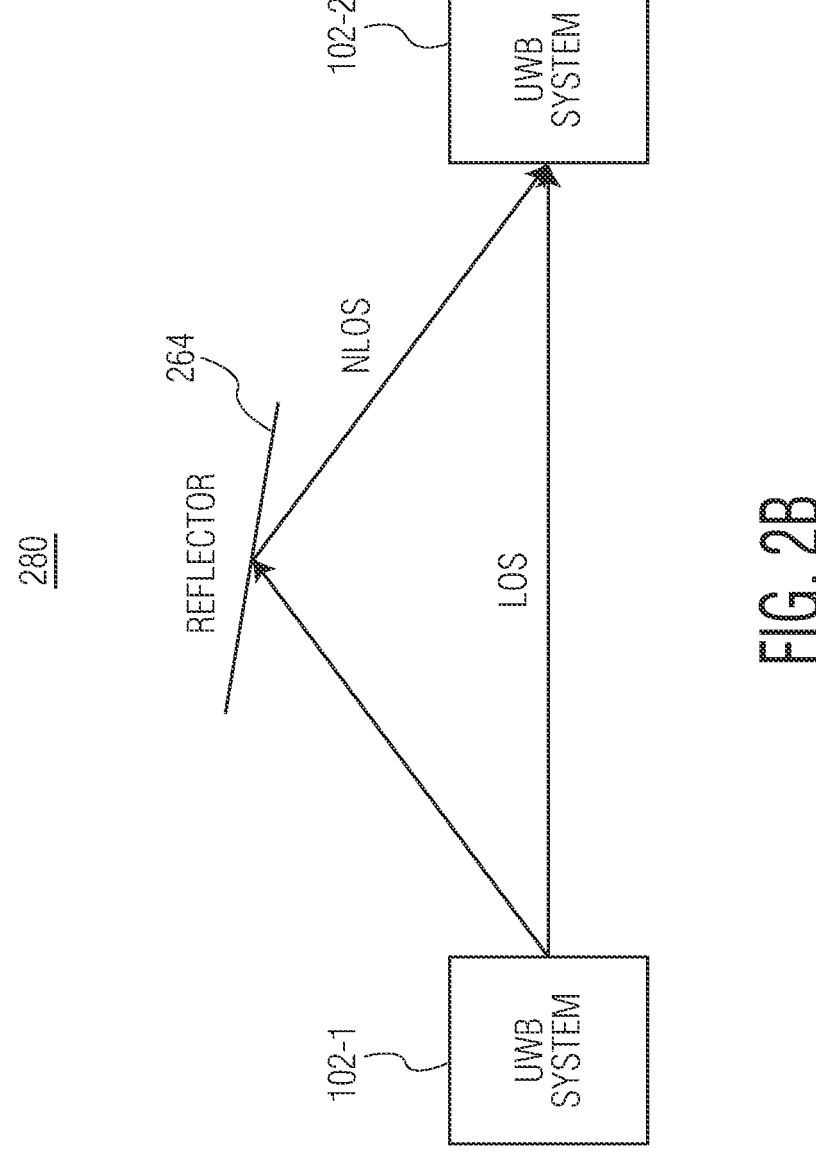
FIG. 2B depicts a multi-path communications scenario of the UWB communications system depicted in FIG. 1.

FIG. 2B depicts a multi-path communications scenario 280 of the UWB communications system 100 depicted in FIG. 1. In the multi-path communications scenario 280 depicted in FIG. 2B, the UWB system 102-1 communicates with the UWB system 102-2 in both LOS and in NLoS. Specifically, a reflector 264 can reflect UWB signals from the UWB system 102-1 to the UWB system 102-2, and vice versa. The reflector 264 may be a surface of an object, for example, a frequency-selective surface (FSS), which is a repetitive surface configured to reflect, transmit or absorb electromagnetic fields on a frequency basis. The UWB system 102-1 can communicate with the UWB system 102-2 directly in LoS without reflection. In some embodiments, the UWB system 102-1 only communicates with the UWB system 102-2 in NLoS and does not communicate with the UWB system 102-2 directly in LoS without reflection. When the UWB systems 102-1, 102-2 operate in NLoS scenarios or multipath rich environments, the communications channel between the UWB systems 102-1, 102-2 and phase of signals can experience drastic changes and thus can result in less precise AoA estimates. In some embodiments, the UWB systems 102-1, 102-2 distinguish between good/precise AoA estimates from bad/imprecise AoA estimates. The UWB systems 102-1, 102-2 may distinguish between good/precise AoA estimates from bad/imprecise AoA estimates by having a confidence level on each AoA estimate. In some embodiments, at least one of the UWB systems 102-1, 102-2 uses a Figure-of-Merit (FoM) algorithm to evaluate the communications channel conditions and the antenna characteristic curves and provides a confidence level on an AoA estimate. For example, at least one of the UWB systems 102-1, 102-2 uses a FOM algorithm to identify bad/imprecise AoA estimates (e.g., AoA estimates with lower AoA FOM confidence level(s)), and to filter out the bad/imprecise AoA estimates and hence improve the average AoA estimation accuracy. Each AoA estimate may have an AoA FOM confidence level between zero to one, with one being the highest confidence level. By incorporating a FOM algorithm along with an AoA algorithm, the reliability of the AoA result is improved.

Figure 3:
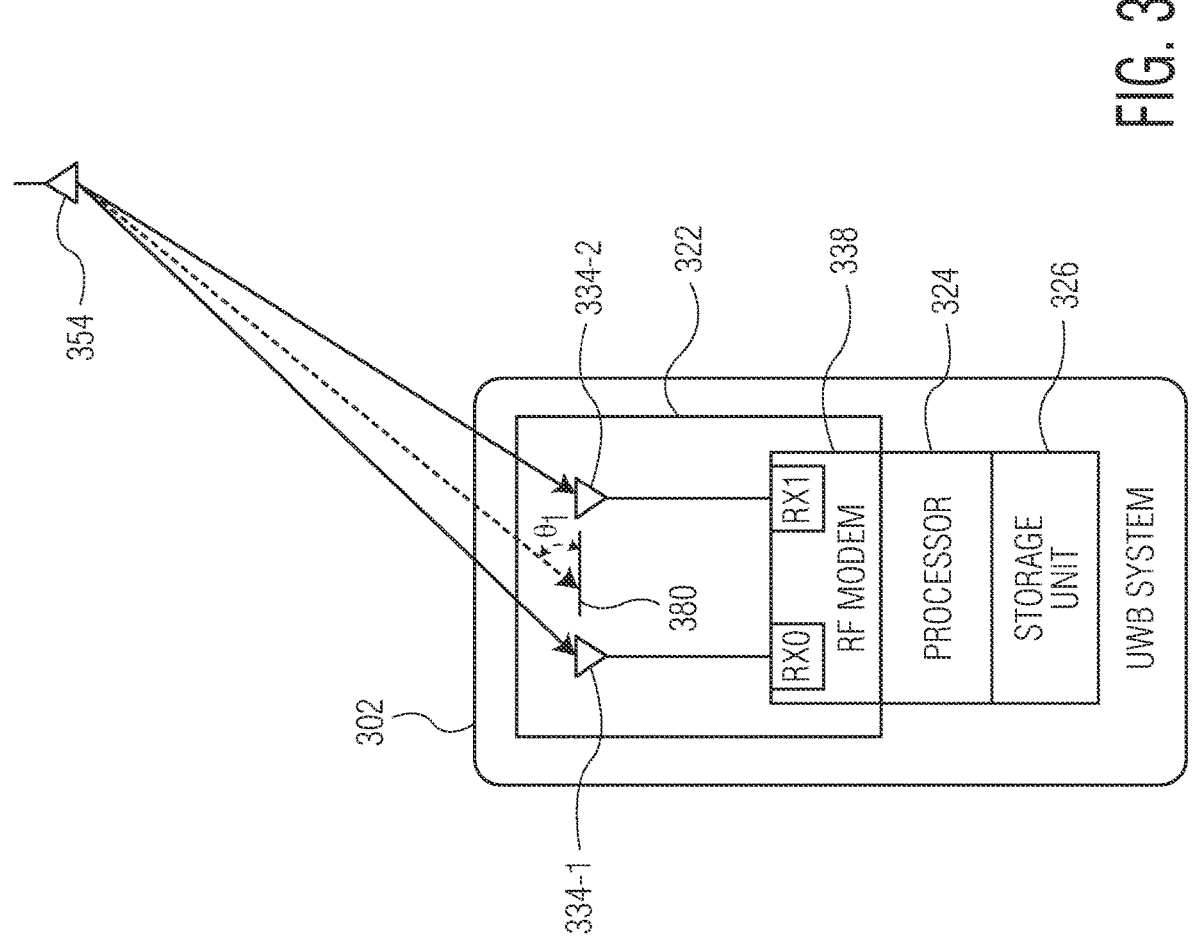
FIG. 3 depicts an embodiment of the UWB systems of the UWB communications system depicted in FIG. 1.

FIG. 3 depicts an embodiment of the UWB systems 102-1, . . . , 102-N of the UWB communications system 100 depicted in FIG. 1. In the embodiment depicted in FIG. 3, a UWB system 302 includes a dual-antenna UWB receiver arrangement or array 322, a processor 324 operably connected to the dual-antenna receiver, and a storage unit 326 for storing information related to the UWB system 302. The UWB system 302 depicted in FIG. 3 is one possible embodiment of the UWB systems 102-1, . . . , 102-N depicted in FIG. 1. However, the UWB systems 102-1, . . . , 102-N depicted in FIG. 1 are not limited to the embodiment shown in FIG. 3. The UWB system 302 may be implemented in hardware, firmware, and/or a combination of hardware, software, and/or firmware. In an embodiment, the UWB system 302 or a component of the UWB system 302 is packaged as a stand-alone integrated circuit (IC) chip. For example, the dual-antenna UWB receiver arrangement 322 can be implemented in at least one substrate, such as at least one semiconductor wafer. In an embodiment, the dual-antenna UWB receiver arrangement is packaged as a stand-alone IC chip. In another example, the processor 324 can be implemented in at least one substrate, such as at least one semiconductor wafer. In an embodiment, the processor 324 is packaged as a stand-alone IC chip.

In the embodiment depicted in FIG. 3, the dual-antenna UWB receiver arrangement 322 includes a first antenna 334-1, a second antenna 334-2, and an RF modem 338 configured to process (e.g., decode) received UWB signals from the first and second antennas. In the embodiment depicted in FIG. 3, the RF modem 338 includes two receivers RX0, RX1 connected to the first antenna 334-1 and the second antenna 334-2, respectively, to process (e.g., decode) received UWB signals from the first and second antennas. In some embodiments, the dual-antenna UWB receiver arrangement 322 also functions a transmitter, and the RF modem 338 is configured to decode received UWB signals from the first and second antennas and to encode UWB signals to be transmitted by the first and second antennas. In some embodiments, the dual-antenna UWB receiver arrangement 322 includes at least one switch configured to switch the first antenna and/or the second antenna between transmitting outgoing UWB signals and receiving incoming UWB signals. In some embodiments, the dual-antenna UWB receiver only has the capability of receiving UWB signals and does not include switch or switches to switch the first antenna and/or the second antenna between transmitting outgoing UWB signals and receiving incoming UWB signals. Although the UWB system 302 is shown in FIG. 3 as including two antennas 334-1, 334-2, in other embodiments, the UWB system 302 includes more than two antennas. In addition, although the UWB system 302 is shown in FIG. 3 as including two receivers RX0, RX1, in other embodiments, the UWB system 302 includes more than two receivers.

In the embodiment depicted in FIG. 3, the processor 324 is configured to determine angle of arrival (AoA) information from the UWB signals received from the two antennas 334-1, 334-2 and to distinguish between good/precise AoA estimates from bad/imprecise AoA estimates. In some instances, the AoA information is related to an angle between a respective USB system having an antenna 354 and the UWB system 302 relative to a reference line (e.g., a horizon line or a vertical line). In some embodiments, the processor distinguishes between good/precise AoA estimates from bad/imprecise AoA estimates by having a confidence level on each AoA estimate. In some embodiments, the processor uses a Figure-of-Merit (FoM) algorithm, which may be stored in the storage unit 326, to evaluate the wireless communications channel conditions and the antenna characteristic curves of the UWB system 302 and provides a confidence level on an AoA estimate. For example, the processor uses a FOM algorithm to identify bad/imprecise AoA estimates (e.g., AoA estimates with lower AoA FOM confidence level(s)), and to filter out the bad/imprecise AoA estimates and hence improve the average AoA estimation accuracy. In some embodiments, each AoA estimate has an AoA FoM confidence level that is presented as a number from zero to one, with zero being the lowest confidence level and one being the highest confidence level. In some embodiments, the confidence level can be represented by a different range of numbers, such as a range of numbers between one and one-hundred, although other numerical representations of the confidence level are possible. In some embodiments, each AoA estimate has a confidence level that is presented as a non-number level. For example, an AoA estimate may have a confidence level that is represented as high, medium, or low. In other embodiments, the confidence level may be characterized in some other manner, such by colors (e.g., green as high confidence, yellow as medium confidence, and red as low confidence). By incorporating a FOM algorithm along with an AoA algorithm, the reliability of the AoA result is improved. In some embodiments, the processor is a microcontroller, a digital signal processor (DSP), or a central processing unit (CPU). In some embodiments, the processor includes a DSP processor configured to execute an FoM algorithm and a hardware processor (e.g., a reduced instruction set computer (RISC) processor such as an Advanced RISC Machines (ARM) processor) configured to compute final FoM results. In an example operation of the UWB system 302, an angle θ1 between the respective UWB system with the antenna 354 and the UWB system 302 relative to a reference horizon line 380 is estimated by the processor from a difference between the time of arrival of a UWB radio pulse from the antenna 354 of the respective UWB system at the first antenna 334-1 of the dual-antenna UWB receiver and the time of arrival of the UWB radio pulse from the antenna 354 of the respective UWB system at the second antenna 334-2 of the dual-antenna UWB receiver.

In some embodiments, the processor 324 is configured to obtain an AoA estimate from UWB signals received at the first antenna 334-1 and the second antenna 334-2 and determine a confidence level for the AoA estimate based on an FoM algorithm. In some embodiments, the processor 324 obtains the AoA estimate by calculating, generating, and/or producing the AoA estimate. In other embodiments, the processor 324 obtains the AoA estimate by receiving or requesting the AoA estimate from other source(s) (e.g., the RF modem 338). In some embodiments, the processor is further configured to perform a Channel Impulse Response (CIR) analysis by analyzing complex CIR samples of the receivers RX0, RX1 of the dual-antenna UWB receiver arrangement 322 and to determine the confidence level for the AoA estimate based on the CIR analysis. In some embodiments, the processor is further configured to perform the CIR analysis to obtain multipath component information and phase difference of Arrival (PDoA) variance information. In some embodiments, the multipath component information includes confidence information of a rising edge and confidence information of a main lobe width of the complex CIR samples of the dual-antenna UWB receiver arrangement 322. In some embodiments, the multipath component information further includes confidence information of a first valid index difference of the complex CIR samples of the dual-antenna UWB receiver arrangement 322. In some embodiments, the multipath component information further includes confidence information of a first path index difference of the complex CIR samples of the dual-antenna UWB receiver arrangement 322. In some embodiments, the multipath component information includes a combination of a confidence level of a rising edge and a confidence level of a main lobe width of the complex CIR samples, a confidence level of a first valid index difference of the complex CIR samples, and a confidence level of a first path index difference of the complex CIR samples. In some embodiments, the PDoA variance information includes a signal-to-noise (SNR) ratio variance at a PDoA index on the complex CIR samples and PDoA drift information.

In the embodiment depicted in FIG. 3, the storage unit 326 is configured to store information related to the UWB system 302 (e.g., communications information and/or location information of the UWB system 302). In some embodiments, the storage unit stores an FoM algorithm and AoA estimations and FoM information of the AoA estimations. The storage unit can be implemented as read only memory (ROM), flash memory, random access memory (RAM), cache, or other type of storage device. Although the illustrated storage unit is shown as being separate from the processor, in some embodiments, the storage unit is implemented within the processor.

In some embodiments, a FOM algorithm used by the UWB system 302 (e.g., the processor 324) takes into account the result of an AoA algorithm (e.g., AoA estimates). In addition, the FoM algorithm can take into account the calibration of PDoA curves. Further, the FoM algorithm can also take into account the Channel Impulse Response (CIR) at each receiver RX0 or RX1, which provides information on the signal-to-noise ratio (SNR) and the phase of the signals. The FoM algorithm can incorporate the above information to qualify each sample as either good/accurate or bad/imprecise (e.g., based on a predefined threshold) at each receiving antenna and hence provide a confidence level based on the above three metrics.

Figure 4:
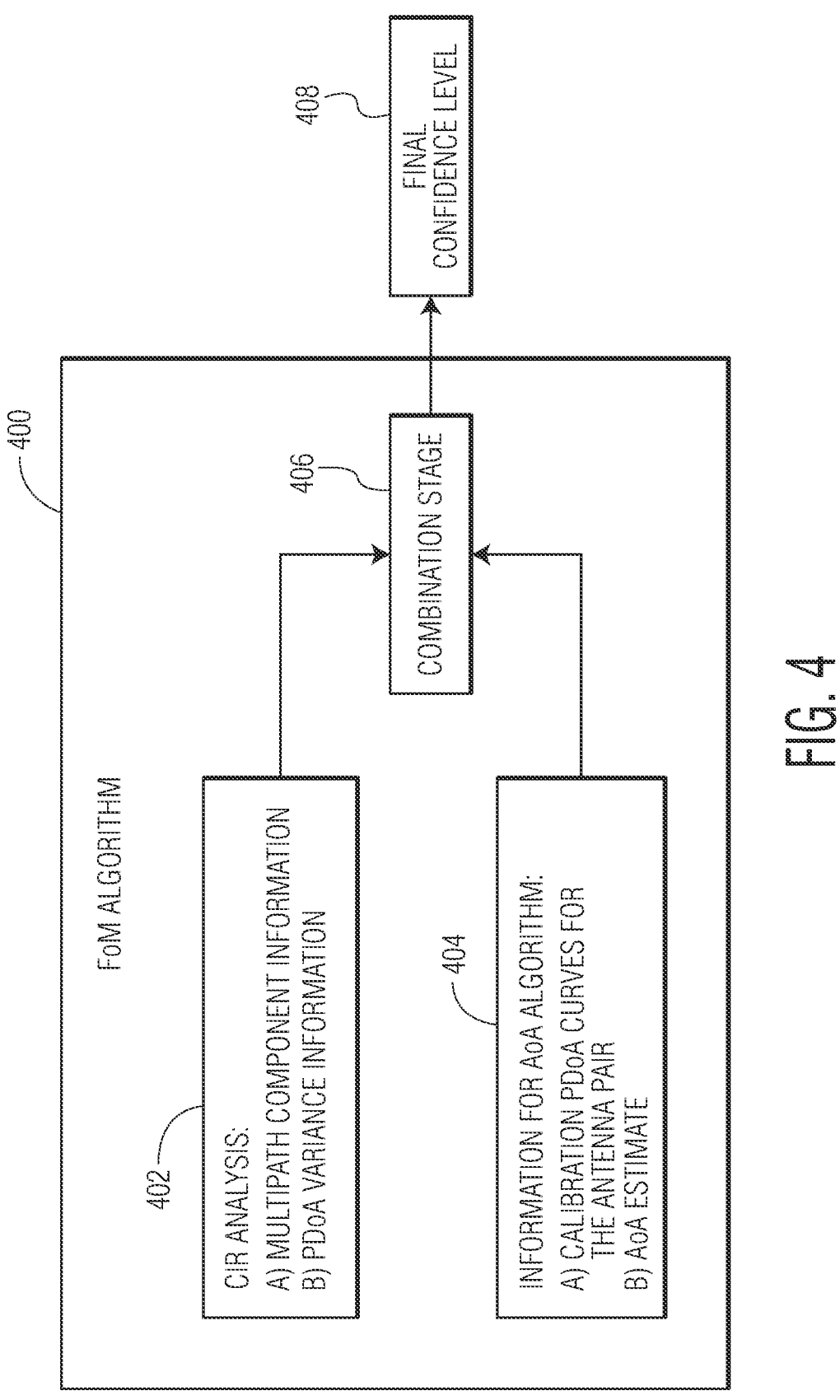
FIG. 4 depicts a FoM algorithm that can be used by the UWB system depicted in FIG. 3.

FIG. 4 depicts a FoM algorithm 400 that can be used by the UWB system 302 depicted in FIG. 3. For example, the FoM algorithm 400 can be stored in the storage unit 326 and executed by the processor 324. In the embodiment depicted in FIG. 4, the FoM algorithm 400 includes a CIR analysis stage 402 that considers CIR analysis information, which includes multipath component information and PDoA variance information. In addition, the FoM algorithm includes an AoA stage 404 that considers information from an AoA algorithm, which includes the calibration of PDoA curves for a corresponding antenna pair (e.g., the first antenna 334-1 and the second antenna 334-2 of the UWB system 302) and AoA estimates. The FoM algorithm can incorporate the above information at a combination stage 406 to provide a confidence level 408 of an AoA estimate.

In the CIR analysis stage 402, the complex CIR samples (e.g., CIR0 for the receiver RX0 and CIR1 for the receiver RX1 of the UWB system 302) can be used to obtain amplitude and phase information. In some embodiments, the CIR analysis stage is a signal quality check stage. In the CIR analysis stage, the obtained CIR samples are evaluated to determine the signal quality as good or bad.

Figure 5:
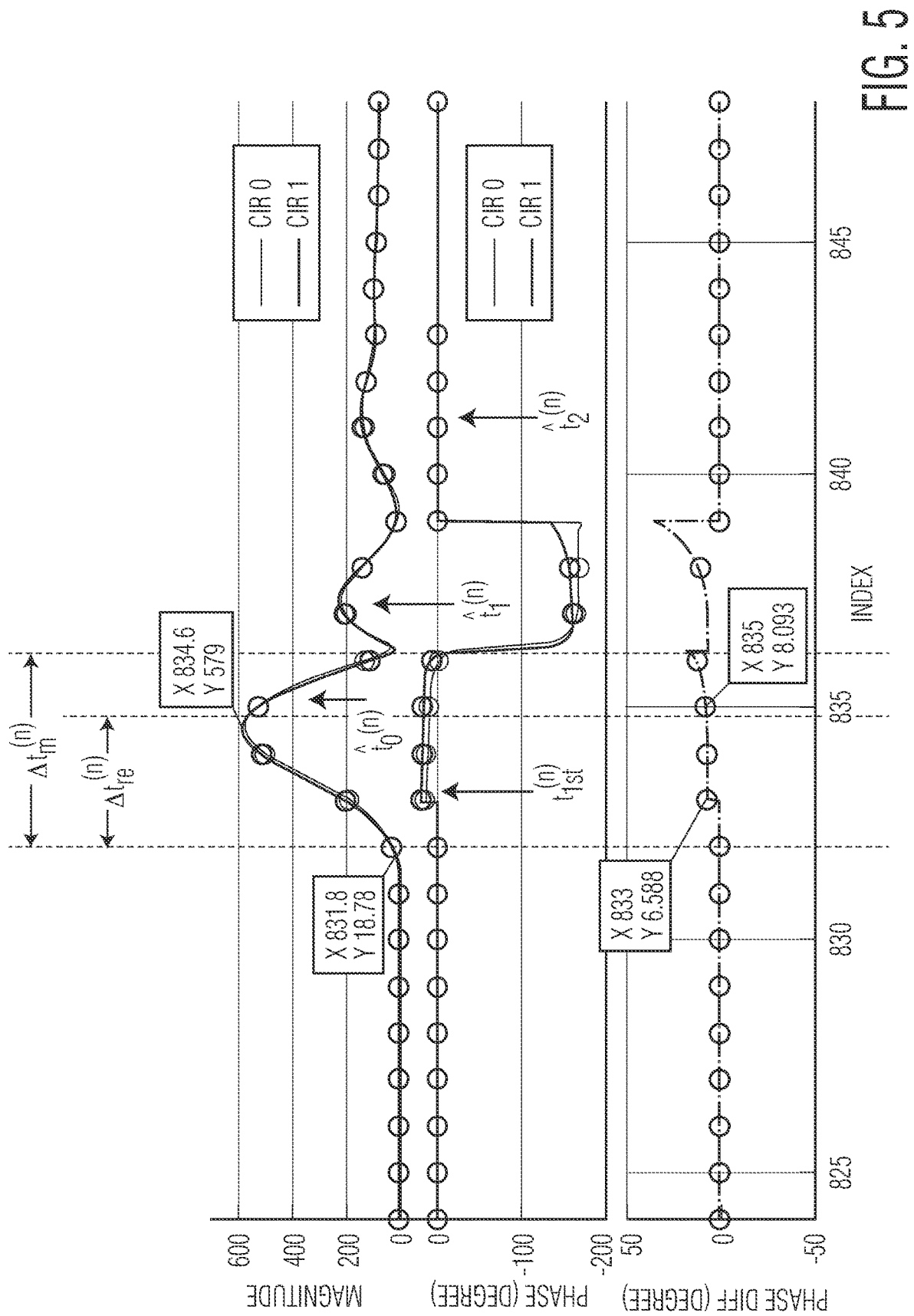
FIG. 5 depicts clean Channel Impulse Response (CIR) amplitude and phase for a LOS wireless communications channel of the UWB system depicted in FIG. 3.
Figure 6:
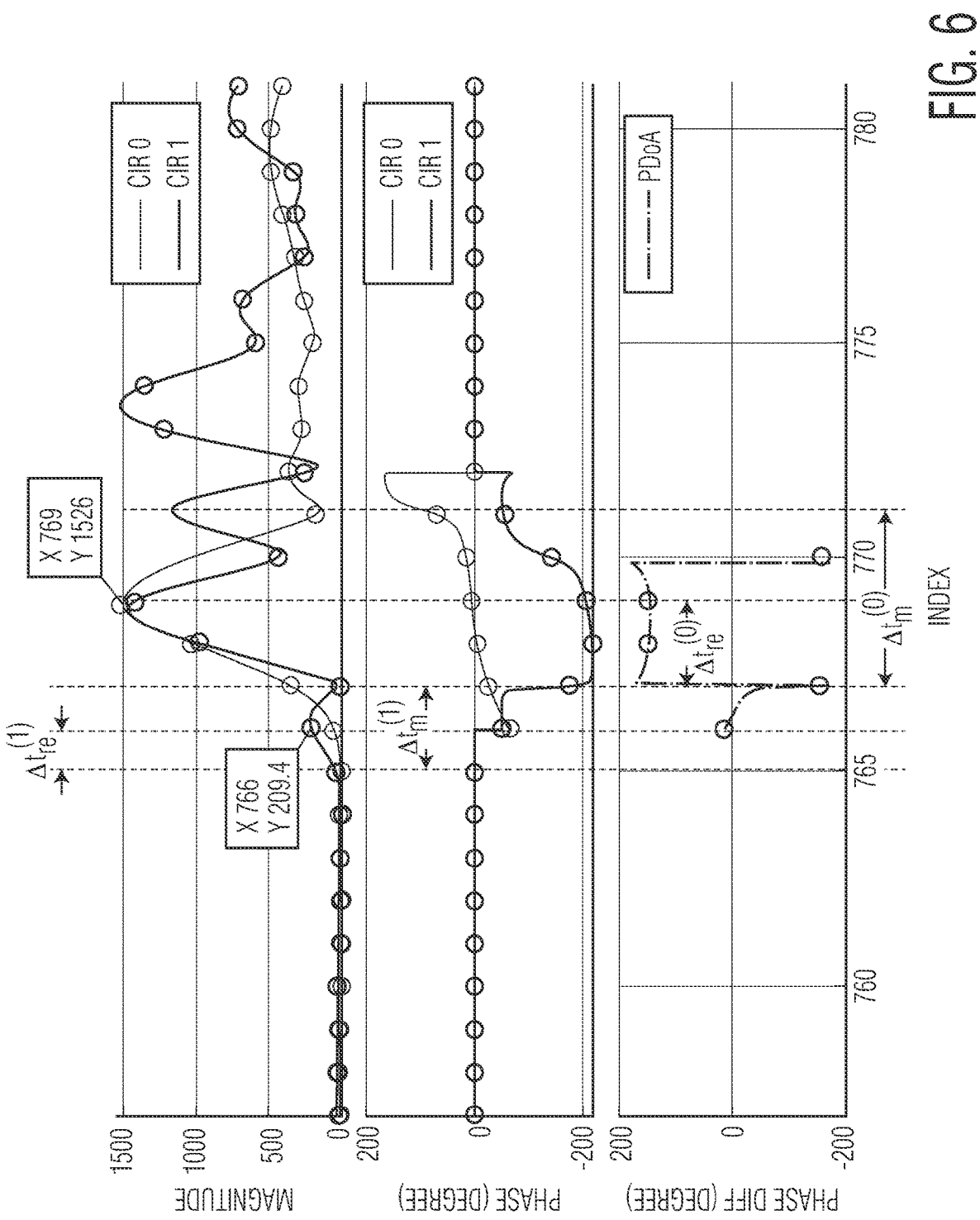
FIG. 6 depicts multipath CIR amplitude and phase of the UWB system depicted in FIG. 3.

Multipath Component Information (MPC):

In the CIR analysis stage 402, the multipath component information analysis can be used, for example, by the processor 324, to determine problematic multipath scenarios that can result in larger AoA errors because of multipath effects in the wireless communications channel of the UWB system 302. FIG. 5 depicts clean CIR amplitude and phase for a LOS wireless communications channel of the UWB system 302 depicted in FIG. 3, while FIG. 6 depicts multipath CIR amplitude and phase of the UWB system 302 depicted in FIG. 3.

I. Pulse Characteristics:

In some embodiments, pulse characteristics are obtained, for example, by the processor 324. Each receiver has an associated CIR. Based on the pulse being used for communications between UWB systems, the main lobe width and the rising edge of the pulse is known. For example, in FIG. 5, the main lobe width, $\Delta t^{(n)}{}_m$ is around 3.3 nanosecond (ns) and the rising edge, $\Delta t^{(n)}{}_{re}$ is around 2.5 nanoseconds (ns). However, in problematic multipath scenarios, the main lobe width and the rising edge deviate from these numbers for CIR1, which can be seen in FIG. 6 where the main lobe for CIR0 is between 767 ns-770 ns, but for CIR1 is between 765 ns-767 ns. The confidence of the rising edge, which can be calculated from the CIRs, can be expressed as:

$$RisingEdgeConf = \tag{1}$$
$$\frac{\sum_{n=0}^{N-1} 1 - \min(RisingEdgeDeviation_n / RisingEdgeRef, 1)}{N}$$

And 0≤RisingEdgeConf≤1 where N is the number of CIRs, and $$RisingEdgeDeviation_n = abs(RisingEdgeRef - RisingEdge_n). \tag{2}$$

In an example, N=2, and RisingEdgeRef=2.5 based on the pulse shape used. In FIG. 5 (LoS case), RisingEdge=2.5 for both CIR0 and CIR1. Consequently, the RisingEdgeConf=1. However, in FIG. 6 (NLoS case), RisingEdge for CIR1 deviates largely from the RisingEdgeRef, resulting in RisingEdgeConf being closer 0. The confidence of the main lobe can be calculated from the CIRs as:

$$MainLobeConf = \tag{3}$$
$$\frac{\sum_{n=0}^{N-1} 1 - \min(MainLobeDeviation_n / MainLobeWidthRef, 1)}{N}$$

And 0≤MainLobeConf≤1 where N is the number of CIRs, and $$MainLobeDeviation_n = abs(MainLobeWifthRef - MainLobeWidth_n). \tag{4}$$

For this example, MainLobeWidthRef may be 3.3 ns.

II. First Valid Index Difference:

In some embodiments, first valid index difference is obtained, for example, by the processor 324. In these embodiments, the first valid index is the first index at which a CIR sample magnitude is above a predefined threshold. In some embodiments, the predefined threshold is determined based on the noise variance calculation and is referred to as the noise variance threshold. The first valid index may be determined for two receivers (e.g., the two receivers RX0, RX1 of the UWB system 302) using the corresponding CIRs. In some embodiments, if this difference in the first valid index between two receivers is greater than a pre-determined threshold, it indicates the presence of problematic multipath component. For example, in FIG. 5 (LoS case), the first valid index of both CIRs is in the same index, i.e., 833 ns. However, in FIG. 6 (NLoS case), the first valid index of CIR0 is at 767 ns and the first valid index of CIR1 is at 766 ns, indicating a problematic multipath environment.

$$FirstValidIndexConf = 1 - \min(FirstValidDiff/FirstValidIdxThr, 1) \quad (5)$$

And $0 \leq FirstValidIdxConf \leq 1$, $$FirstValidDiff = \mathrm{abs}(FirstValidIdx_{cir0} - FirstValidIdx_{cir1}) \quad (6)$$

If FirstValidIdxThr=3, for FIG. 6 (NLoS case) FirstValidIndexConf=1−min(1/3, 1).

III. First Path Index Difference:

In some embodiments, first path index difference is obtained, for example, by the processor 324. In these embodiments, the first path index is the index of the peak of the main lobe of the pulse in the CIR. In some embodiments, if the difference in the first path indices of two receivers (e.g., the two receivers RX0, RX1 of the UWB system 302) is above a pre-determined threshold, it indicates a problematic multipath scenario. For example, in FIG. 5, the estimated first path is at 834.6 ns on both the CIRs. However, in FIG. 6, the estimated first path index on CIR0 is 769, whereas the value on CIR1 is 766. This indicates the estimates of 2 CIRs are 3 ns apart indicating a problematic multipath environment.

$$FirstPathIdxConf = 1 - \min(FirstPathIdcDiff/FirstPathIdxThr, 1) \quad (7)$$

And $0 \leq FirstPathIdxConf \leq 1$ $$FirstPathIdxDiff = \mathrm{abs}(FirstPathIdx_{cir0} - FirstPathIdx_{cir1}) \quad (8)$$

If FirstPathIdxThr=2, for FIG. 6 (NLoS case), FirstPathIdxConf=1−min(3/2, 1).

Multipath component information can be obtained, for example, by the processor 324 as a combination of the confidence level of the CIR rising edge, the confidence level of the CIR main lobe width, a confidence level of the first valid index difference, and a confidence level of the first path index difference. In some embodiments, the multipath component information MPC FOM can be expressed as:

$$MPC\ FOM = \alpha_1 RisingEdgeConf + \quad (9)$$
$$\alpha_2 MainLobeConf + \alpha_3 FirstValidIdxConf + \alpha_4 FirstPathIdxConf$$

where $\alpha_1 + \alpha_2 + \alpha_3 + \alpha_4 = 1$.

Based on the above four factors, the multipath component information has a value between zero and one, with zero indicating the worst multipath environment and one indicating a clean LoS environment. This value is further integrated into the PDoA variance calculation.

PDoA Variance Information:

In some embodiments, PDoA variance information is obtained, for example, by the processor 324. In some embodiments, the PDoA variance information is mainly dependent on two factors, a signal-to-noise (SNR) ratio variance at a PDoA index on the complex CIR samples of a multi-antenna UWB receiver arrangement (e.g., the dual-antenna UWB receiver arrangement 322) and PDoA drift information.

I. SNR Variance at PDoA Index:

In some embodiments, the difference in phase between two receivers' CIR samples (CIRs) is calculated on the rising edge of the pulse. The SNR at a PDoA index on both CIRs provides a good indication of the wireless communications channel as seen by both receivers (e.g., the two receivers RX0, RX1 of the UWB system 302). When the wireless communications channel between UWB systems is a direct Line of Sight (LoS), the SNR at the PDoA index on both CIRs is high and identical. A problematic multipath scenario can lead to at least one CIR being distorted and hence results in low SNR. In some embodiments, the SNR variance at the PDoA index can be given as:

$$\sigma_{SNR}^2 = \frac{1}{2SNR_0} + \frac{1}{2SNR_1} \quad (10)$$

II. PDoA Drift:

In some embodiments, the PDoA drift is the change in the phase over indexes around the PDoA index. In a problematic multipath scenario, the change in phase over consecutive samples is high and high changes can lead to incorrect PDoA estimates and lead to higher AoA errors. Consequently, PDoA drift can help identify such scenarios where the result is bound to be incorrect. In some embodiments, the PDoA drift is given by:

$$\phi_{DRIFT}^2 = \left[\left(\Delta\theta_{PDOA\_IDX} - \Delta\theta_{(PDOA\_IDX-1)}\right) \times \left(\frac{\pi}{180}\right)\right]^2 \quad (11)$$

$$\text{where, } \Delta\theta_{PDOA\_IDX} = \theta[\mathrm{PDOA\_IDX}, CIR1] - \theta[\mathrm{PDOA\_IDX}, CIR0] \quad (12)$$

$$\Delta\theta_{PDOA\_IDX-1} = \theta[\mathrm{PDOA\_IDX} - 1, CIR1] - \theta[\mathrm{PDOA\_IDX} - 1, CIR0] \quad (13)$$

Consequently, the total PDoA variance is given as the sum of SNR at PDoA index and PDoA drift.

$$\sigma_{PDOA}^2 = \sigma_{SNR}^2 + \phi_{DRIFT}^2 \quad (14)$$

Figure 7:
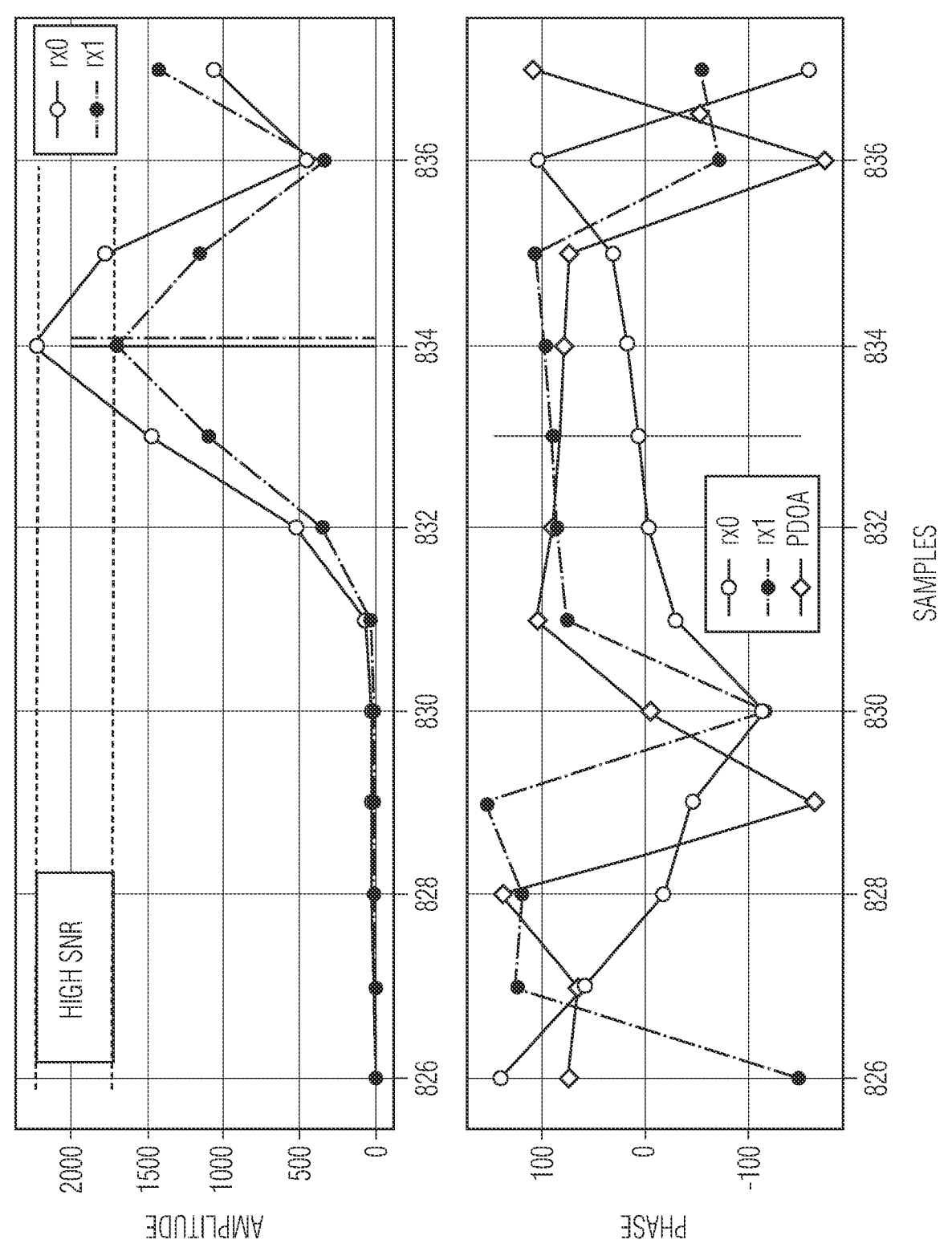
FIG. 7 depicts some examples of CIR amplitudes and phase and a PDoA curve in LoS.
Figure 8:
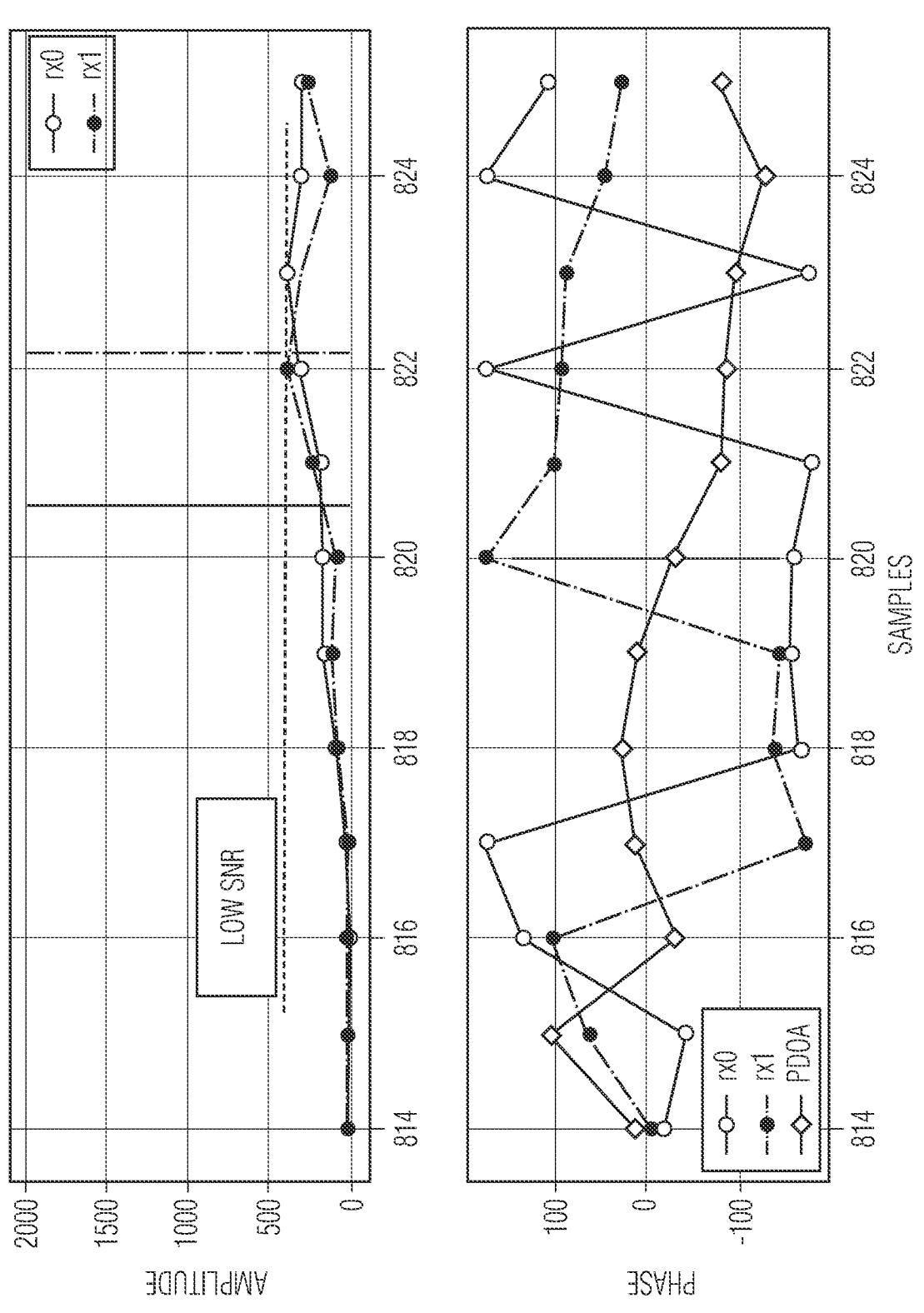
FIG. 8 depicts some examples of CIR amplitudes and phase and a PDoA curve in NLoS.

Some examples of CIRs are shown below in FIG. 7 and FIG. 8, respectively. Specifically, FIG. 7 depicts some examples of CIR amplitudes and phase and a PDoA curve in LoS. The PDoA SNR is high because of high CIR amplitudes and the phase is flat around the PDoA index. FIG. 8 depicts some examples of CIR amplitudes and phase and a PDoA curve in NLoS. The PDoA SNR is low because of low CIR amplitudes and the phase change is large around the PDoA index.

Information from the AoA Algorithm:

In the AoA stage 404, calibration PDoA curves for the antenna pair and AoA estimates are obtained, for example, by the processor 324. The AoA estimate is the result of the AoA algorithm that is also used as input to the FoM algorithm.

In some embodiments, PDoA curves for a given device depend on the antenna characteristics, which are collected in the offline mode by sweeping the azimuth from −60 degrees to 60 degrees in steps of 12 degrees. These calibration curves are used by the AoA algorithm to arrive at a final AoA result. These curves can also have two possible error regions based on the antenna characteristic, which are the slope of a PDoA curve at a given point and ambiguous regions in the PDoA curves.

Figure 9:
FIG. 9 depicts an example of a PDoA curve.

In some embodiments, when a UWB system (e.g., the UWB system 302) is swept to collect the characteristic PDoA curves at each point, the PDoA values keep changing. However, the rate of change of PDoA may not be uniform, i.e., the PDoA curves between two azimuth angles may vary independently of the variation between any other two points. FIG. 9 depicts an example of a PDoA curve 900. For instance, the rate of change of PDoA values from 48 degrees to 60 degrees is lesser than the rate of change of PDoA values from 0 degrees to 12 degrees. As shown in FIG. 9, as the PDoA change is small between 48 to 60 degrees azimuth, a small error in the PDoA leads to the AoA azimuth result being in a new region. Consequently, these regions where the PDoA change is flat are regions that can potentially cause high AoA estimation errors and need be considered to provide the confidence level calculation.

Figure 10:
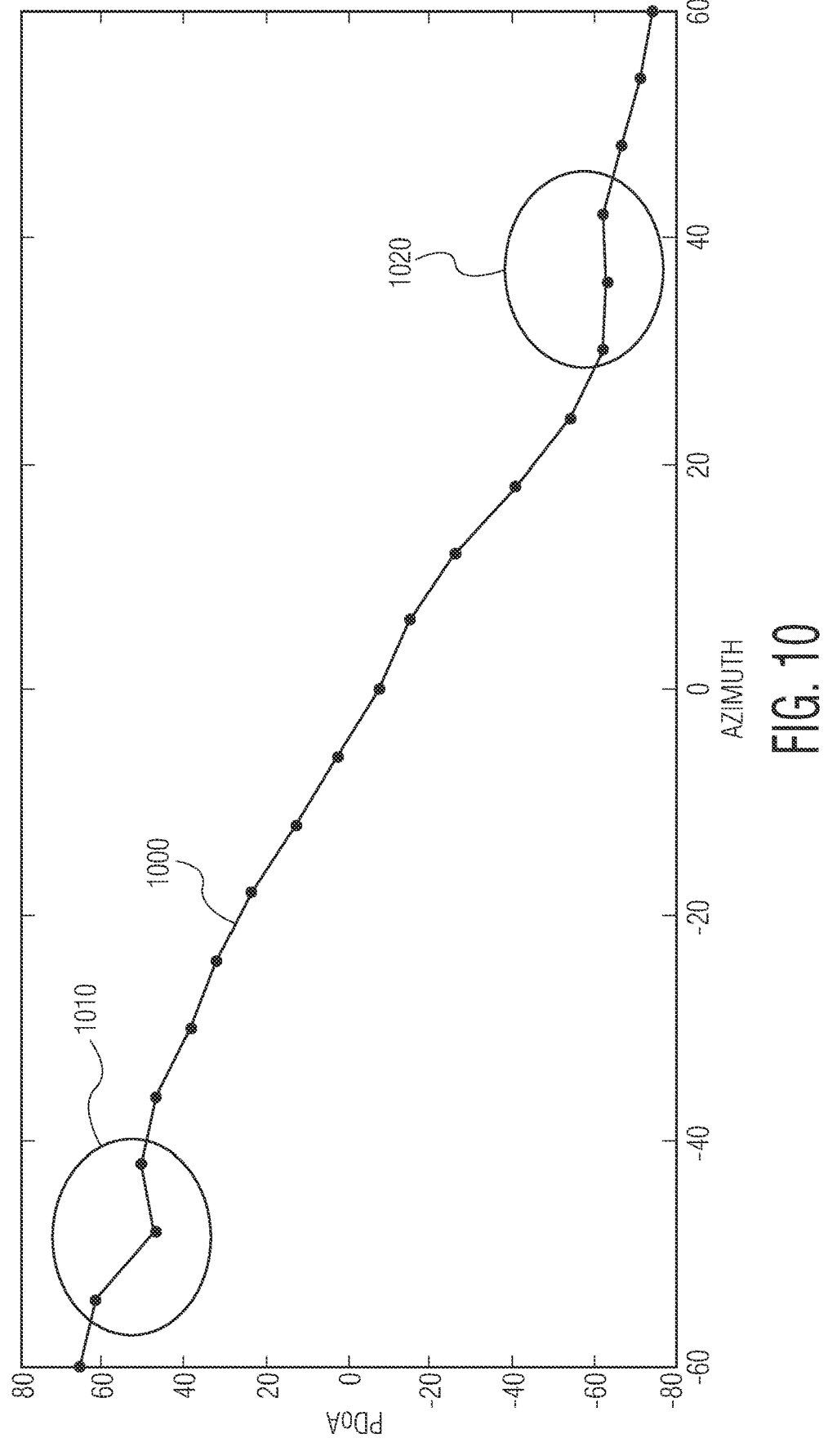
FIG. 10 depicts some examples of ambiguous regions in a PDoA curve.

In some embodiments, there are ambiguous regions in the PDoA curves that can lead to multiple AoA values for the same PDoA, which can lead to ambiguity in the AoA estimate as this introduces large AoA errors. FIG. 10 depicts some examples of ambiguous regions in a PDoA curve 1000. As shown in FIG. 10, regions 1010, 1020 are the possible ambiguous regions. For instance, a PDoA value of 50 degrees can have two possible AoA estimates, one between −54 and −48 degrees and another between −48 and −42 degrees. In such cases, an AoA value is derived based on probability. If there are n=0, 1, 2, N such ambiguous regions, their probabilities are reciprocal of their slope values, i.e., $$Probability_n = \frac{\frac{1}{slope_n}}{\sum_{n=0}^{N} \frac{1}{slope_n}} \tag{15}$$

Each possible AoA value can be multiplied with its associated probability and summed together, i.e., $$AoAValue = \sum_{n=0}^{N} Probability_n \times AoA_n.$$

Some or all of the factors described above can be combined, for example, by the processor 324 to obtain a FOM confidence level. For example, the following parameters can be combined to obtain the FoM confidence level:

a) MPC component: value between zero and one (If zero, the value is reset to 0.01);

b) PDoA variance;

c) PDoA slope value;

d) PDoA ambiguous region information.

Assuming the AoA error to follow a normal distribution around a mean, the first three factors a), b), c) can be combined to obtain the standard deviation and the fourth factor is the bias.

$$standard\ deviation = \tag{16}$$
$$sqrt\big(\big((1/MPC)*PDoA\ variance\big)\big)/(\beta*PDoA\ slope)$$

$$bias = abs\ (AoA\ estimate - AoAvalue),\ where\ \beta\ is\ a\ tunable\ constant. \tag{17}$$

Using the obtained standard deviation and bias, the final confidence interval value can be obtained by passing these values to a normal distribution look up table or any numerical approximation based on CDF. This approximation can be designed to obtain a +/−3 degrees, +/−5 degrees confidence interval. Each sample may have a FoM value between 0 to 1. A cutoff value can be used to filter out samples. For example, all samples with FoM>=0.9 can be qualified as good samples and the AoA estimates can be used with high confidence. All samples with FoM<0.9 are rejected as bad samples. In some embodiments, the FoM algorithm is executed in a DSP processor and a hardware processor (e.g., an ARM processor) computes the final FoM result.

In some embodiments, the FoM algorithm 400 is tested in a wireless AoA setup with two UWB ranging devices, which are placed, for example, at a distance (e.g., around two meters) from each other. One UWB device operates as the initiator and the other UWB device operates as the responder. The initiator reports AoA and the corresponding FoM results. The FoM result can be obtained by post processing the AoA result obtained from an automated setup. For example, the initiator may be connected to a dual robot in which one robot performs the azimuth sweeping and the other robot performs the elevation sweeping. The AoA estimates can be obtained by sweeping different azimuth and elevation combinations and the PDOAs can be postprocessed by the FoM algorithm to obtain the confidence level result for each sample. Compared to an LoS scenario, in an NLoS scenario, because of multipath effects, there are less samples qualified as good/accurate by the FoM algorithm, and more samples qualified as bad/imprecise by the FoM algorithm.

Figure 11:
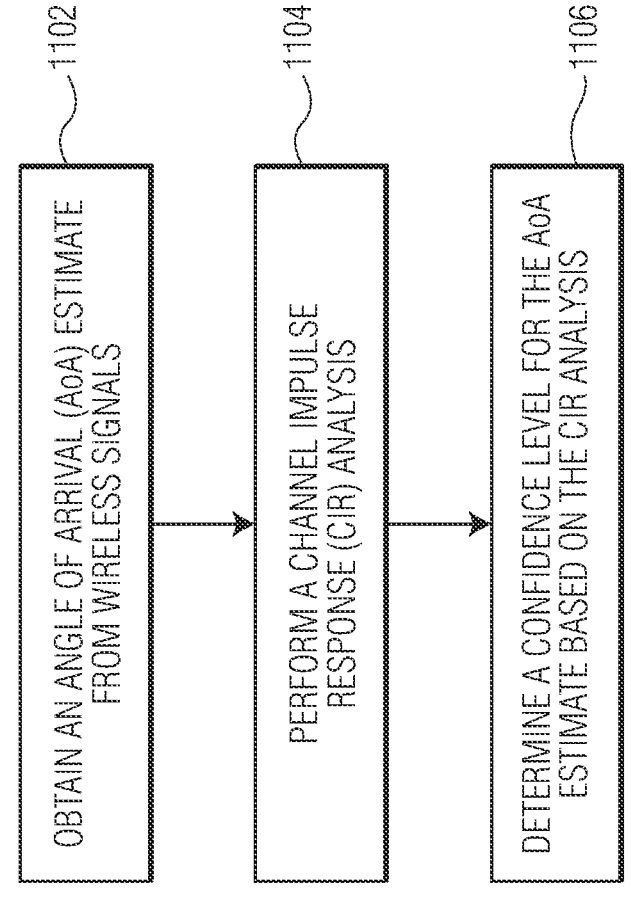
FIG. 11 is a process flow diagram of a method for wireless communications in accordance with an embodiment of the invention.

FIG. 11 is a process flow diagram of a method for wireless communications in accordance with an embodiment of the invention. At block 1102, an AoA estimate is obtained from wireless signals. At block 1104, a CIR analysis is performed. At block 1106, a confidence level for the AoA estimate is determined based on the CIR analysis.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless communications system comprising:
a processor configured to:
obtain an angle of arrival (AoA) estimate from a plurality of wireless signals;
perform a Channel Impulse Response (CIR) analysis; and
determine a confidence level for the AoA estimate based on the CIR analysis;
wherein the processor is further configured to perform the CIR analysis to obtain multipath component information and phase difference of Arrival (PDoA) variance information.

2. The wireless communications system of claim 1, wherein the multipath component information comprises confidence information of a rising edge and confidence information of a main lobe width of a plurality of complex CIR samples.

3. The wireless communications system of claim 2, wherein the multipath component information further comprises confidence information of a first valid index difference of the complex CIR samples.

4. The wireless communications system of claim 3, wherein the multipath component information further comprises confidence information of a first path index difference of the complex CIR samples.

5. The wireless communications system of claim 1, wherein the multipath component information comprises a combination of a confidence level of a rising edge and a confidence level of a main lobe width of a plurality of complex CIR samples, a confidence level of a first valid index difference of the complex CIR samples, and a confidence level of a first path index difference of the complex CIR samples.

6. The wireless communications system of claim 1, wherein the PDoA variance information comprises a signal-to-noise (SNR) ratio variance at a PDoA index on a plurality of complex CIR samples and PDoA drift information.

7. The wireless communications system of claim 1, wherein the processor is further configured to analyze a plurality of complex CIR samples to obtain confidence information of a rising edge and confidence information of a main lobe width of the complex CIR samples.

8. The wireless communications system of claim 1, wherein the processor is further configured to obtain a phase difference of Arrival (PDoA) slope value and PDoA ambiguous region information and to determine the confidence level for the AoA estimate based on the PDoA slope value and the PDoA ambiguous region information.

9. The wireless communications system of claim 1, wherein the wireless signals comprise a plurality of ultra-wide band (UWB) signals.

10. The wireless communications system of claim 9, further comprising a multi-antenna UWB receiver configured to receive the UWB signals.

11. A ultra-wide band (UWB) system comprising:
a multi-antenna UWB receiver arrangement configured to receive a plurality of UWB signals;
a processor operably connected to the multi-antenna UWB receiver arrangement, wherein the processor is configured to:
obtain an angle of arrival (AoA) estimate from the UWB signals;
perform a Channel Impulse Response (CIR) analysis by analyzing a plurality of complex CIR samples of a plurality of receivers of the multi-antenna UWB receiver arrangement; and
determine a confidence level for the AoA estimate based on the CIR analysis; and
a storage unit configured to store the AoA estimate and the confidence level for the AoA estimate;
wherein the processor is further configured to perform the CIR analysis to obtain multipath component information and phase difference of Arrival (PDoA) variance information.

12. The UWB system of claim 11, wherein the multipath component information comprises confidence information of a rising edge and confidence information of a main lobe width of the complex CIR samples of the multi-antenna UWB receiver arrangement.

13. The UWB system of claim 12, wherein the multipath component information further comprises confidence information of a first valid index difference of the complex CIR samples of the multi-antenna UWB receiver arrangement.

14. The UWB system of claim 13, wherein the multipath component information further comprises confidence information of a first path index difference of the complex CIR samples of the multi-antenna UWB receiver arrangement.

15. The UWB system of claim 11, wherein the PDoA variance information comprises a signal-to-noise (SNR) ratio variance at a PDoA index on the complex CIR samples of the multi-antenna UWB receiver arrangement and PDoA drift information.

16. The UWB system of claim 11, wherein the processor is further configured to obtain a phase difference of Arrival (PDoA) slope value and PDoA ambiguous region information and to determine the confidence level for the AoA estimate based on the CIR analysis, the PDoA slope value, and the PDoA ambiguous region information.

17. A method for wireless communications comprising:
obtaining an angle of arrival (AoA) estimate from a plurality of wireless signals;
performing a Channel Impulse Response (CIR) analysis; and
determining a confidence level for the AoA estimate based on the CIR analysis;
wherein performing the CIR analysis comprises performing the CIR analysis to obtain multipath component information and phase difference of Arrival (PDoA) variance information.

18. A wireless communications system comprising:
a processor configured to:
obtain an angle of arrival (AoA) estimate from a plurality of wireless signals;

perform a Channel Impulse Response (CIR) analysis; and
determine a confidence level for the AoA estimate based
   on the CIR analysis;
wherein the processor is further configured to analyze a
   plurality of complex CIR samples to obtain confidence
information of a rising edge and confidence informa-
   tion of a main lobe width of the complex CIR samples.
19. A wireless communications system comprising:
a processor configured to:
obtain an angle of arrival (AoA) estimate from a plurality of wireless signals;
perform a Channel Impulse Response (CIR) analysis; and
determine a confidence level for the AoA estimate based
   on the CIR analysis;
wherein the processor is further configured to obtain a
phase difference of Arrival (PDoA) slope value and
   PDoA ambiguous region information and to determine
   the confidence level for the AoA estimate based on the
   PDoA slope value and the PDoA ambiguous region
   information.

\* \* \* \* \*